United States Patent
Wang et al.

(10) Patent No.: US 11,690,128 B2
(45) Date of Patent: Jun. 27, 2023

(54) DIGITAL REPRESENTATIONS OF PHYSICAL INTELLIGENT MOVING OBJECTS

(71) Applicant: Fujitsu Limited, Kawasaki (JP)

(72) Inventors: Xi Wang, Murphy, TX (US); Jian Kong, Richardson, TX (US); Nannan Wang, Allen, TX (US); Paparao Palacharla, Richardson, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/298,578

(22) Filed: Mar. 11, 2019

(65) Prior Publication Data

US 2020/0296789 A1 Sep. 17, 2020

(51) Int. Cl.
| | |
|---|---|
| *H04W 76/25* | (2018.01) |
| *H04L 67/10* | (2022.01) |
| *H04W 64/00* | (2009.01) |
| *H04W 76/10* | (2018.01) |
| *H04W 4/46* | (2018.01) |
| *H04W 4/44* | (2018.01) |

(52) U.S. Cl.
CPC ............ *H04W 76/25* (2018.02); *H04L 67/10* (2013.01); *H04W 64/006* (2013.01); *H04W 76/10* (2018.02); *H04W 4/44* (2018.02); *H04W 4/46* (2018.02)

(58) Field of Classification Search
CPC ........ H04W 4/44; H04W 4/46; H04W 64/006
See application file for complete search history.

(56) References Cited

U.S. PATENT DOCUMENTS

| | | | |
|---|---|---|---|
| 9,582,003 B1* | 2/2017 | Levandowski | ...... G05D 1/0088 |
| 10,203,699 B1* | 2/2019 | Kim | ...... G05D 1/0022 |

(Continued)

FOREIGN PATENT DOCUMENTS

WO 2017201722 A1 11/2017

OTHER PUBLICATIONS

Japen Patent Office "Notice of Reasons for Refusal (Office Action)" dated May 11, 2023, in connection with Japanese Patent Application 2020-000702, a foreign counterpart to the present application (U.S. Appl. No. 16/298,578), 4 pages.

*Primary Examiner* — Douglas B Blair
(74) *Attorney, Agent, or Firm* — Fujitsu Patent Center

(57) ABSTRACT

Systems and methods including identifying a physical intelligent moving object (IMO), the physical IMO associated with a current location and a service request; creating, from a digital representation template that is based on the service request, a digital representation instance of the physical IMO in a particular edge cloud of a distributed cloud computing environment that is closest to the current location of the physical IMO; in response to creating the digital representation instance, establishing a network connection between the digital representation and the physical IMO using the particular edge cloud; detecting a movement of the physical IMO from coverage of the particular edge cloud; in response to detecting the movement of the physical IMO: identifying a target edge cloud of the distributed cloud computing environment for coverage of the physical IMO; and establishing a network connection between the digital representation and the physical IMO using the target edge cloud.

3 Claims, 3 Drawing Sheets

(56) References Cited

U.S. PATENT DOCUMENTS

| | | |
|---|---|---|
| 11,232,705 B2 * | 1/2022 | Yang .................... G08G 1/0145 |
| 2012/0108163 A1 * | 5/2012 | Bai ...................... H04L 12/1854 |
| | | 455/3.06 |
| 2016/0205238 A1 * | 7/2016 | Abramson ......... G01C 21/3641 |
| | | 455/456.4 |
| 2017/0076331 A1 * | 3/2017 | Lei ..................... G06Q 30/0267 |
| 2017/0311197 A1 * | 10/2017 | Lopes .................... H04W 8/26 |
| 2018/0063261 A1 * | 3/2018 | Moghe ................... H04L 67/12 |
| 2018/0074747 A1 * | 3/2018 | Hasegawa ............. G06F 3/0631 |
| 2018/0124631 A1 * | 5/2018 | Ramos de Azevedo .................... |
| | | H04W 40/18 |
| 2019/0037474 A1 | 1/2019 | Xu et al. |
| 2019/0158606 A1 * | 5/2019 | Guim Bernat .......... H04L 67/34 |
| 2019/0289610 A1 * | 9/2019 | Ju ........................ H04L 65/607 |
| 2019/0311614 A1 * | 10/2019 | Yang ....................... G08G 1/04 |
| 2019/0316919 A1 * | 10/2019 | Keshavamurthy .......................... |
| | | G08G 1/096822 |
| 2019/0318620 A1 * | 10/2019 | Yang .................... G08G 1/0133 |
| 2020/0019445 A1 * | 1/2020 | Altintas ................ G06F 9/4856 |
| 2020/0267518 A1 * | 8/2020 | Sabella .................. H04W 48/16 |
| 2020/0274942 A1 * | 8/2020 | Mueck ................ H04L 67/2804 |
| 2020/0287960 A1 * | 9/2020 | Higuchi ............ H04W 72/0413 |
| 2021/0153019 A1 * | 5/2021 | Bachmutsky ......... H04W 76/10 |

* cited by examiner

DIGITAL REPRESENTATIONS OF PHYSICAL INTELLIGENT MOVING OBJECTS

BACKGROUND

Field of the Disclosure

The present disclosure relates generally to the creation and implementation of digital representations of physical intelligent moving objects.

Description of the Related Art

Emerging technologies (e.g., autonomous vehicles, industrial IoT, robotics, etc.) are driving strong demands on the network and cloud infrastructures. A new wave of Intelligent Moving Objects (IMOs) such as connected/self-driving cars, drones, and robots rely heavily on the network and cloud for maximizing their performance/functionalities. IMOs are high-functionality mobile terminals that have built-in computing/networking/sensing/maneuvering capabilities. IMOs in different cases can have vastly different QoS (Quality of Service) requirements such as response time, processing load, up/down link bandwidth, and network/service availability. To satisfy such heterogeneous service needs, a new distributed cloud and network architecture called multi-access edge computing (MEC) has recently been proposed. By running applications and performing related processing tasks closer to the mobile terminals, network congestion is reduced, and applications perform better.

Today, physical IMOs such as connected cars interact directly with data/applications in the central cloud (e.g., V2I (Vehicle-to-Infrastructure)) and/or with other IMOs (e.g., V2V (Vehicle-to-Vehicle)). However, such environments can lead to too much network traffic and too much service delay for V2I; and unreliable and limited-range communication for V2V. In some V2I deployments today, a connected car needs to obtain the nearby (several hundreds of feet away) traffic signal information through sequential access of multiple remote clouds, some of which are thousands of miles away. The current dedicated short-range communications (DSRC) typically supports only up to several hundreds of meters of effective communication range and several hundreds of neighboring cars, beyond which V2V communication is either unreachable or unreliable.

SUMMARY

Innovative aspects of the subject matter described in this specification may be embodied in methods that include the actions of identifying a physical intelligent moving object (IMO), the physical IMO associated with a current location and a service request; creating, from a digital representation template that is based on the service request, a digital representation instance of the physical IMO in a particular edge cloud of a distributed cloud computing environment that is closest to the current location of the physical IMO; in response to creating the digital representation instance of the physical IMO, establishing and maintaining a network connection between the digital representation of the physical IMO and the physical IMO using the particular edge cloud; detecting a movement of the physical IMO from coverage of the particular edge cloud; in response to detecting the movement of the physical IMO: identifying a target edge cloud of the distributed cloud computing environment for coverage of the physical IMO; and establishing and maintaining a network connection between the digital representation of the physical IMO and the physical IMO using the target edge cloud.

Other embodiments of these aspects include corresponding systems, apparatus, and computer programs, configured to perform the actions of the methods, encoded on computer storage devices.

These and other embodiments may each optionally include one or more of the following features. For instance, in response to creating the digital representation of the physical IMO, establishing a network connection between the digital representation of the physical IMO and a central cloud infrastructure. In response to creating the digital representation of the physical IMO, establishing a connection with one or more other digital representations of other physical IMOs using the particular edge cloud. In response to detecting the movement of the physical IMO: creating a copy of the digital representation of the physical IMO; and establishing and maintaining a network connection between the copy of the digital representation of the physical IMO and the physical IMO using the target edge cloud. The network connection between the digital representation of the physical IMO and the physical IMO using the particular edge cloud is maintained. Identifying a change in the service request, and in response, splitting the digital representation of the physical IMO into two or more digital representations of the physical IMO based on the change in the service request. Identifying a change in the service request, and in response, merging the digital representation of the physical IMO with another digital representation of another physical IMO based on the change in the service request.

Particular implementations of the subject matter described in this specification can be implemented so as to realize one or more of the following advantages. For example, improved vehicle-to-infrastructure (V2I) is provided by having less network traffic and service delay through the distributed computing on a localized network. Improved vehicle-to-vehicle (V2V) is provided by having a digital representation of a physical IMO directly interact with other digital representations for more efficient and speedier data acquisition and decision making. Improved mobility as the digital representation migrates following the physical IMO's movement, further enhancing V2I and V2V performance.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

This document describes methods, systems, and computer readable medium for a digital representation (DR) of a physical intelligent moving object (IMO) for multi-access edge computing. The DR is a service-oriented virtual IMO that resides in the edge cloud, and includes data (e.g., state), service logic (e.g., decision making), and virtual agility (e.g., migration). The DR can interact with the cloud computing environment and other DRs on behalf of the physical IMO.

Specifically, this document describes methods and systems that include the actions of identifying a physical intelligent moving object (IMO). The physical IMO can be associated with a current location and a service request. A digital representation instance of the physical IMO is created from a digital representation template that is based on the service request. The digital representation can be created in a particular edge cloud of a distributed cloud computing environment that is closest to the current location of the physical IMO. In response to creating the digital representation instance of the physical IMO, a network connection is established and maintained between the digital representation of the physical IMO and the physical IMO using the particular edge cloud. A movement of the physical IMO from coverage of the particular edge cloud is detected. In response to detecting the movement of the physical IMO, a target edge cloud of the distributed cloud computing environment is identified for coverage of the physical IMO. A network connection is established and maintained between the digital representation of the physical IMO and the physical IMO using the target edge cloud.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
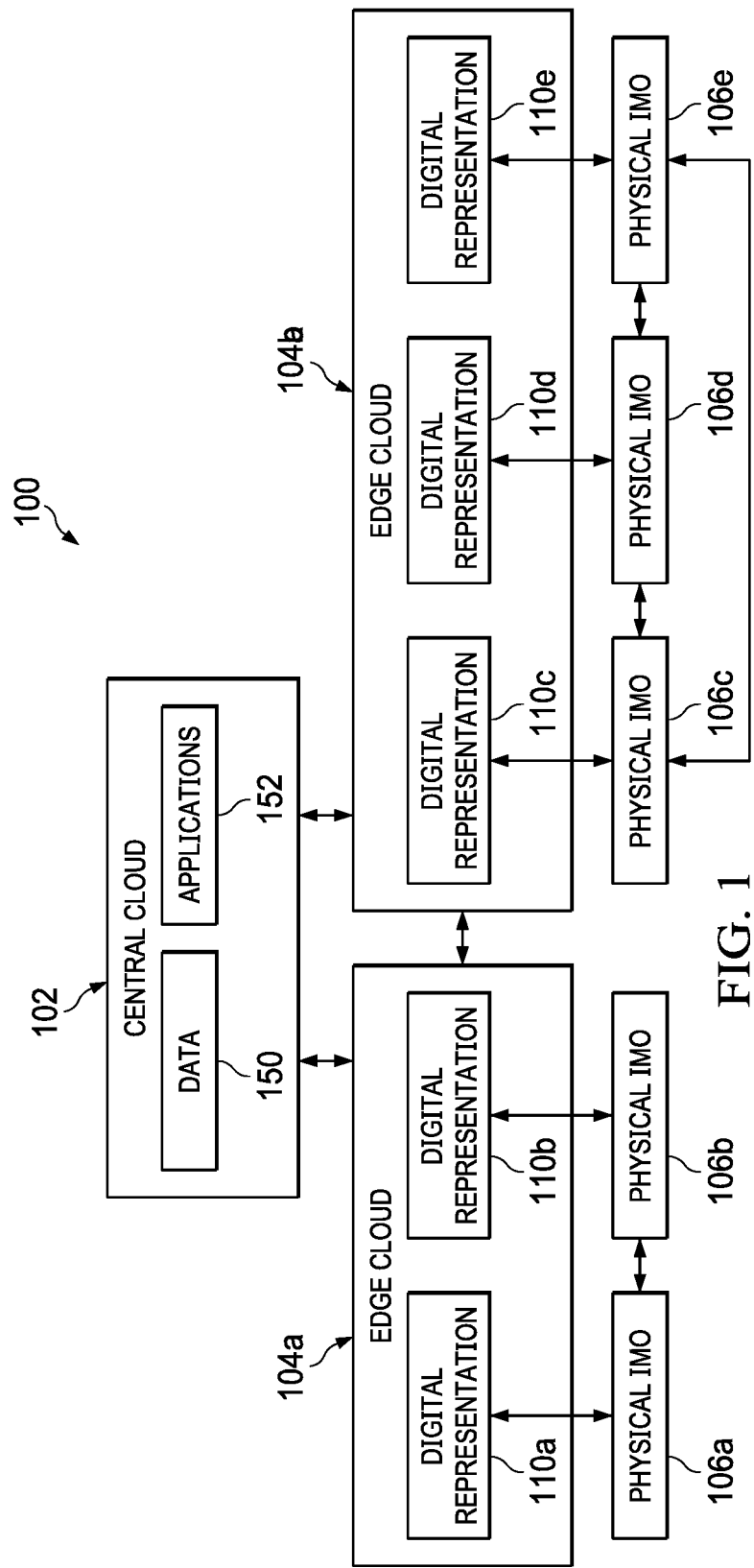
FIG. 1 is a block diagram of selected elements of a computing environment including a central cloud computing network and edge cloud computing networks.

FIG. 1 illustrates a computing environment 100. The computing environment 100 can include a central (or core) cloud computing network 102 (or central cloud 102), a first edge cloud computing network 104a and a second edge cloud computing network 104b (collectively referred to as edge cloud computing networks 104, or edge clouds 104), and physical intelligent moving objects (IMO) 106a, 106b, 106c, 106d, 106e (collectively referred to as physical IMOs 106). The central cloud 102 can include data 150 and applications 152 for interaction between the central cloud 102 and the edge clouds 104.

The edge cloud 104a can be in communication with the central cloud 102, the edge cloud 104b, and the physical IMOs 106a, 106b. The edge cloud 104b can be in communication with the central cloud 102, the edge cloud 104a, and the physical IMOs 106c, 106d, 106e. The physical IMOs 106a, 106b can be in communication with each other; and the physical IMOs 106c, 106d, 106e can be in communication with each other.

The computing environment 100 can further include digital representations ("digital genies") that are virtual IMOs that implement (or mirror) a specific set of functions/services of the corresponding physical IMO. In the illustrated example, a digital representation 110a corresponds to (represents) the physical IMO 106a; a digital representation 110b corresponds to (represents) the physical IMO 106b; a digital representation 110c corresponds to (represents) the physical IMO 106c; a digital representation 110d corresponds to (represents) the physical IMO 106d; and a digital representation 110e corresponds to (represents) the physical IMO 106e. The digital representations 110a, 110b, 110c, 110d, 110e can be collectively referred to as digital representations (DRs) 110.

In short, the digital representations 110 i) are created in the edge cloud 104 that has a direct network connection with the physical IMO 106; ii) reside in the edge cloud 104 closest to the physical IMO 106 for low latency responsiveness (however, in some examples, the digital representations 110 can reside in the cloud network 102 or a "fog" network); iii) includes virtual agility (e.g., migration, duplication, split, and merge following physical IMO 106 movement and/or changing service needs); iv) have omnidirectional communication interfaces (to the physical IMO 106, to the cloud network 102, and to other digital representations 110); and v) can direct exchange/invoke data/functions with other digital representations 110, the physical IMO 106, and/or the cloud network 102. In some examples, the digital representations 110 include three internal elements: data (e.g., current/last-know states of the corresponding physical IMO 106); service logic (e.g., control of access to the data); and virtual agility.

The central cloud 102 and the edge clouds 104 can include computing processors (not shown) and memory media (not shown), which may store executable instructions (i.e., executable code) that may be executable by the processor, which has access to the memory media. The processor may execute instructions that cause a network management system to perform the functions and operations described herein. For the purposes of this disclosure, the memory media may include non-transitory computer-readable media that stores data and instructions for at least a period of time. The memory media may comprise persistent and volatile media, fixed and removable media, and magnetic and semiconductor media. The memory media may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. The memory media is operable to store instructions, data, or both. The memory media as shown includes sets or sequences of instructions that may represent executable computer programs, namely, the digital representations 110. That is, the processors can implement the digital representations 110, that are stored by the memory media.

Each of the central cloud 102 and the edge clouds 104 can include a network interface (not shown) which may be a suitable system, apparatus, or device operable to serve as an interface between the central cloud 102, the edge clouds 104, and the physical IMOs 106. The network interface may enable communications using a suitable transmission protocol or standard. In certain embodiments, the central cloud 102 and/or the edge clouds 104 may include at least certain portions of a public network, such as the Internet, and can be implemented using hardware, software, or various combinations thereof.

Figure 2:
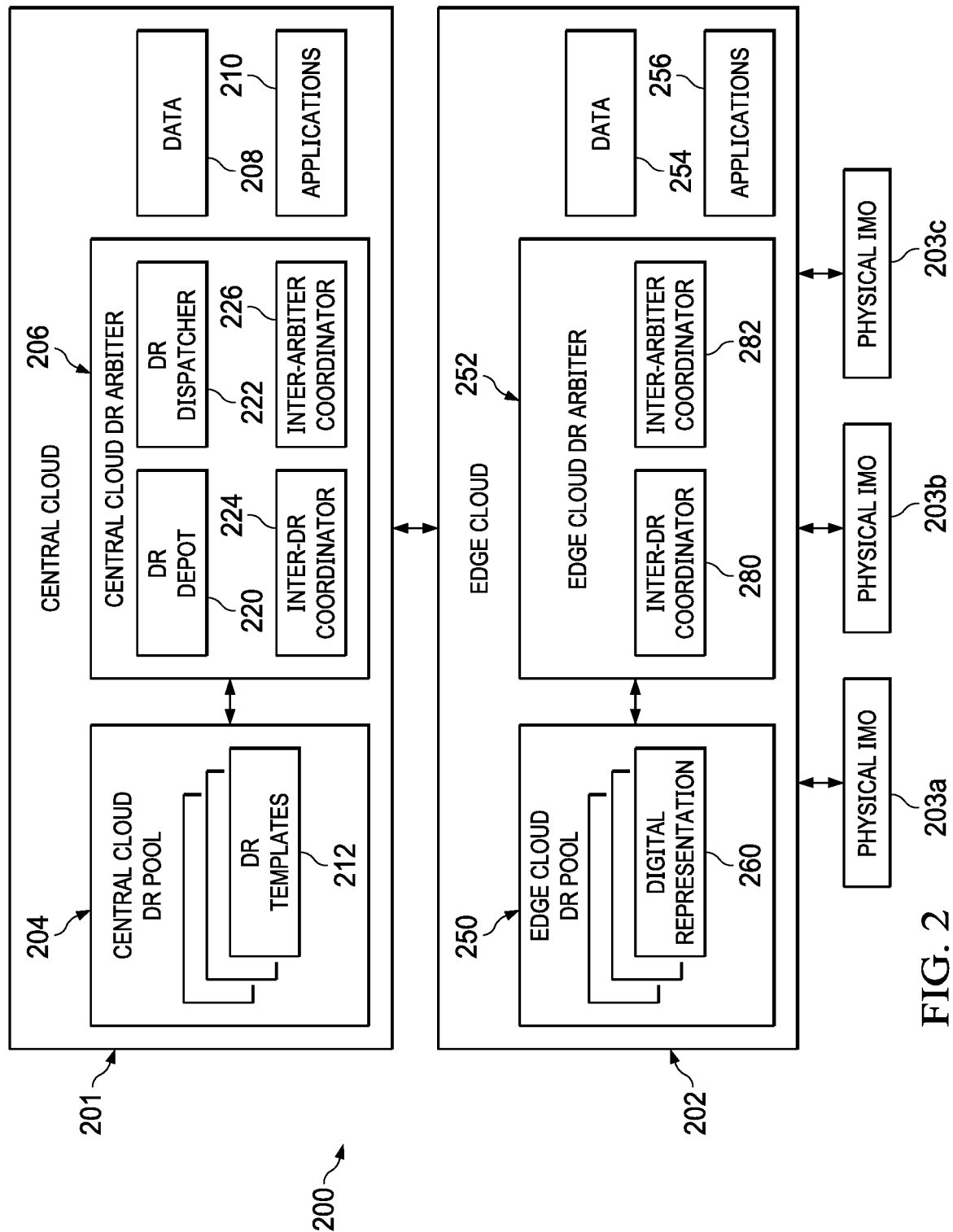
FIG. 2 is a block diagram of selected elements of a computing environment including components of the central cloud computing network and the edge cloud computing networks.

FIG. 2 illustrates a computing environment 200, similar to the computing environment 100 of FIG. 1. The computing environment 200 can include a central cloud computing network 201 (similar to the central cloud computing network 102), an edge cloud computing network 202 (similar to the edge cloud computing network 104), and physical IMOs 203a, 203b, 203c (collectively referred to as physical IMOs 203; similar to the physical IMOs 106). In some examples, the environment can include any number of edge cloud computing networks 202.

The central cloud computing network 201 (or central cloud 201) can include a central cloud digital representation (DR) template pool 204, a central cloud digital representation (DR) arbiter 206, data 208, and applications 210. The central cloud DR template pool 204 can host digital representation (DR) templates 212; and the central cloud DR arbiter 206 can manage the DR templates 212. Memory media of the central cloud 201 can include sets or sequences of instructions that may represent executable computer programs, namely, the central cloud DR arbiter 206. That is, the processor(s) of the central cloud 201 can implement the central cloud DR arbiter 206 that are stored by the memory media. Further, the memory media can store the central cloud DR template pool 204.

The edge cloud computing network 202 (or edge cloud 202) can include an edge cloud digital representation (DR) instance pool 250, an edge cloud digital representation (DR) arbiter 252, data 254, and applications 256. The edge cloud DR instance pool 250 can host digital representation (DR) instances 260; and the edge cloud DR arbiter 252 can manage the DR instances 260. Memory media of the edge cloud 202 can include sets or sequences of instructions that may represent executable computer programs, namely, the edge cloud DR arbiter 252. That is, the processor(s) of the edge cloud 202 can implement the edge cloud DR arbiter 252 that are stored by the memory media. Further, the memory media can store the edge cloud DR instance pool 250.

To that end, as the edge cloud computing network 202 (or edge cloud 202) is dynamic, the central cloud 201 can manage the DR templates 212 that are used to create the DR instances 260. Specifically, the DR arbiter 206 includes a DR depot 220 that creates the DR templates 212 (that are included by the DR template pool 204) based on the service requests of the physical IMOs 206; a DR dispatcher 222 that creates the DR instances 260 and dispatches the same to the destination clouds (e.g., the edge cloud 202); an inter-DR coordinator 224 that coordinates DR interactions within the same cloud (e.g., the edge cloud 202); and an inter-arbiter coordinator 226 that coordinates interactions with DG arbiters (e.g., DR arbiter 206) in other clouds (e.g., other edge clouds 202). For example, the inter-DR coordinator 224 can facilitate DR interactions within the same edge cloud 202 such as enabling the DR instances 260 of the same cloud (e.g., the edge cloud 202) in finding each other; and the inter-arbiter coordinator 226 can facilitate locating a DR instance 260 that has migrated to a neighboring edge cloud (e.g., from the edge cloud 202).

The edge cloud DR arbiter 252 can include an inter-DR coordinator 280 that coordinates DR interactions within the same cloud (e.g., the edge cloud 202); and an inter-arbiter coordinator 282 that coordinates interactions with the DG arbiter (e.g., DG arbiter 206) in other clouds (e.g., other edge clouds 202). The DR instances 260 that are stored by the edge cloud DR instance pool 250 can provide services to the physical IMOs 203.

In some implementations, the physical IMOs 203 can be associated with a current location and a service request. The current location can include a physical location of the physical IMOs 206 in the real-world, or with respect to other objects in the real-world (e.g., other physical IMOs), or with respect to cloud computing networks (e.g., the edge cloud 202). The service request can be associated with a particular (or singular) type of service that is associated with the physical IMO 203. For example, when the physical IMO 206 includes a self-driving car, the service request can include one service associated with the self-driving car such as braking, steering, acceleration, etc.

In some implementations, the DR arbiter 206, and specifically, the DR depot 220, creates, based on a specific set of functions/services of the physical IMOs 203, the DR templates 212 that contain such functions/services. The DR arbiter 206, and specifically, the DR dispatcher 222, can create a particular DR instance 260 of a particular physical IMO 203 based on a particular DR template 212. Specifically, for a particular IMO 203 and a service request of the particular IMO 203, the DR arbiter 206 creates the particular DR instance 260 from the particular DR template 212 that corresponds to such a service request. In some examples, the particular DR instance 260 is an "embodiment" of the particular DG template 212—similar to the creation of an object from a class (as in a computer program).

Additionally, the particular DR instance 260 can be created for a particular edge cloud (e.g., edge cloud 202) that is physically closest to the current location of the particular IMO 203. That is, the environment 200 can include multiple edge clouds, and the particular DR instance 260 is created in the edge cloud (e.g., edge cloud 202) that is located closest to the particular physical IMO 203. That is, each edge cloud can cover, or include, a certain geographic area, with the physical IMOs 203 physically positioned within one of the geographic areas at a time (however, the physical IMOs can move between the geographic areas). To that end, the particular DR instance 260 is created in the edge cloud that covers, or includes, the geographic area the corresponding IMO 203 is physically located in.

In some implementations, in response to creating the particular DR instance 260 of the particular physical IMO 203, the DR arbiter 206 establishes and maintains a network connection between the particular DR instance 260 and the particular physical IMO 203. Specifically, the DR arbiter 206 provides information (e.g., IP address/URL, etc.) for the particular physical IMO 203 to establish a network connection with the particular DR instance 260. The particular DR instance 260 maintains a constant network connection with the particular physical IMO 203 to provide edge computing service. Further, the particular physical IMO 203 and the particular DR instance 260, over the network connection, can exchange data (e.g., a state of the physical IMO 203) and intents (e.g., decisions made by the computing logic of the particular DR instance 260).

In some examples, in response to creating the particular DR instance 260 of the particular physical IMO 203, the DR arbiter 206 establishes (and maintains) a network connection between the particular DR instance 260 and the central cloud 201. In some examples, in response to creating the particular DR instance 260 of the particular physical IMO 203, the DR arbiter 206 establishes (and maintains) a network connection between other DR instances 260 of other physical IMOs 203 and the particular DR instance 260 using the edge cloud 202 (e.g., through an exposed API of the DR instances 260). In other words, the particular DR instance 260 has an omnidirectional communication interface. For example, the particular DR instance 260 is able to have communications interfaces with i) the central cloud 201 (north communication interface), ii) the particular physical IMO 203 (south communication interface), and iii) other DR instances 260 (east-west communication interface) located within the edge cloud 202.

In some implementations, the particular DR instance 260 can detect movement of the corresponding particular physical IMO 203 from coverage of the particular edge cloud 202. Specifically, the particular DR instance 260 can detect, via location information from the particular physical IMO 203, that the particular physical IMO 203 is moving from the current coverage provided by the particular edge cloud 202. That is, there can be multiple edge clouds (e.g., the edge cloud 202) that are near the service areas of the physical IMOs 203 mobility area, and the physical IMO 203 is mobile and is able to migrate between such multiple edge clouds.

In some implementations, in response to detecting the movement of the particular physical IMO 203, the particular DR instance 260 identifies a target edge cloud for coverage of the particular physical IMO 203. The particular DR instance 260 can identify the target edge cloud (e.g., edge cloud 202) based on a predicted direction and trajectory of the particular physical IMO 203 within the geographic areas. The particular DR instance 260 further establishes and maintains a network connection with the particular physical IMO 203 using the target edge cloud.

Figure 3:
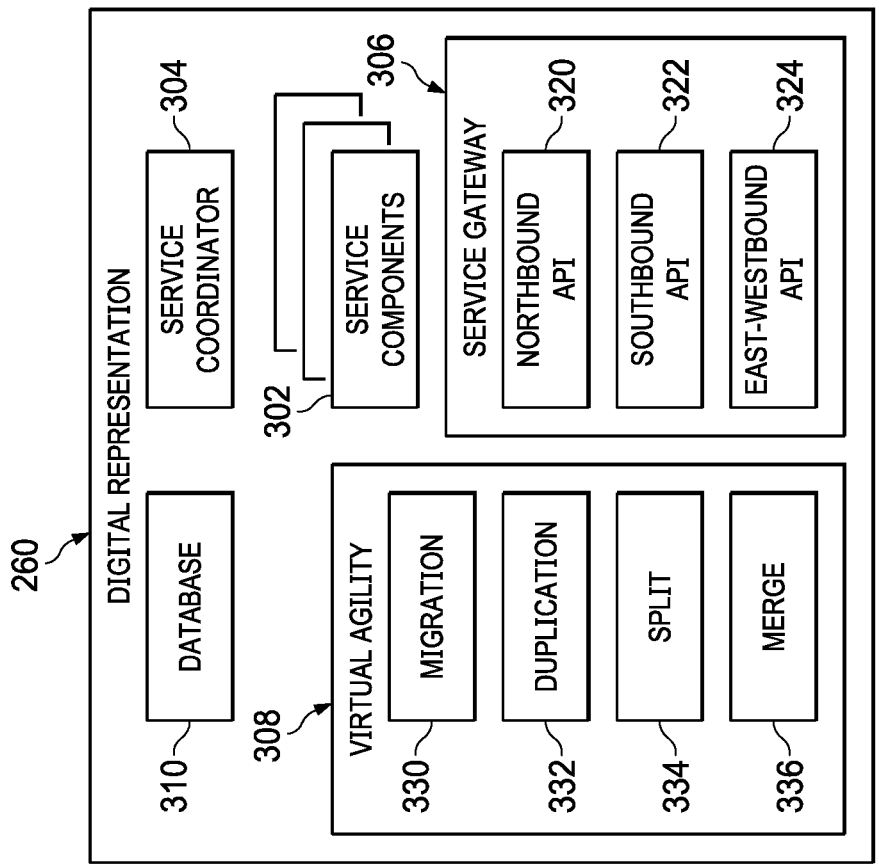
FIG. 3 is a block diagram of selected elements of a computing environment including components of a digital representation of a physical intelligent moving object.

FIG. 3 illustrates an example of components of a DR instance 260. The DR instance 260 can include service components 302, a service coordinator 304, a service gateway 306, a virtual agility component 308, and a database 310. Each of the service components 302 provides one service/function of the DR instance 260. The service coordinator 304 coordinates the service components 302 and provides functions including service registration, discovery, and composition. The service gateway 306 provides the omnidirectional communication interfaces (e.g., APIs) for the DR instances 260 to interact with external entities. The service gateway 306 can include northbound APIs 320 (to the end central cloud 201), southbound APIs 322 (to the particular physical IMO 203), and east-westbound APIs 324 (to other DR instances 260). The virtual agility component 308 handles agility of the DR instance, including migration, duplication, split, and merge, described further herein. The virtual agility component 308 can include a migration component 330, a duplication component 332, a split component 334, and a merge component 336. The database 310 provides a common data store for the DR instance 260.

In some examples, in response to detecting the movement of the particular physical IMO 203, the migration component 330 of the particular DR instance 260 facilitates migration of the particular DR instance 260 to the target edge cloud (e.g., using various cloud technologies such as VM/container live migration). The particular physical IMO 203 reconnects to the migrated particular DR instance 260 and continues to receive edge computing service through the target edge cloud. In particular, the particular DR instance 260 migrates itself from the current edge cloud to a different edge cloud to continue service to the corresponding particular physical IMO 203.

In some examples, to minimize service interruption, the particular physical IMO 203 can connect to multiple DR instances 260 in different edge clouds (e.g., edge cloud 202) in case the particular physical IMO 203 is in the coverage area of multiple edge clouds. In some examples, the particular DR instance 260 can migrate to the central cloud 201 from the edge cloud 202 if the edge cloud 202 is not available. The DR instance 260, when migrated to the central cloud 201, can maintain service continuity, albeit the service quality may degrade due to longer delay, and limited network capacity. In some examples, the DR instance 260 can be removed (from the edge cloud 202 or the central cloud 201) at the end-of-service lifecycle.

In some examples, in response to detecting the movement of the particular physical IMO 203, or changing service needs of the particular physical IMO 203, the duplication component 330 of the particular DR instance 260 facilitate creation of a copy of the particular DR instance 260. That is, the particular DR instance 260 ("host DR instance") creates one or more self-copies ("duplicate DR instance(s)"). The DR arbiter 206 can establish and maintain a network connection between the copy of the particular DR instance 260 and the particular physical IMO 203. The duplicate DR instance 260 can reside in the same edge cloud as the host DR instance 260, or is dispatched to one or more different edge clouds. The duplicate DR instance 260 and the host DR instance 260 can collaborate to collectively provide service to the particular physical IMO 203. In some examples, the network connection between the host DR instance 260 and the particular physical IMO 203 using the edge cloud is maintained. In some examples, the duplicate DR instances can perform pre-processing work (that have migrated to the target edge cloud) prior to the physical IMO 203 being serviced by the target edge cloud.

In some examples, in response to identifying a change in the service request, the split component 334 of the particular DR instance 260 facilitates splitting the particular DR instance 260 into two or more DR instances 260 based on the change in the service request. That is, the particular PR instance 260 ("host PR instance") creates a sub-PR instance 260 that contains a subset of the functions/services/data of the host PR instance 260, e.g., for security or privacy concerns. One or more of the sub-PR instances 260 can be located in the same or different edge clouds, and can collaborate with the host PR instance 260 to collectively provide service.

In some examples, in response to identifying a change in the service request, the merge component 336 of the particular DR instance 260 facilitates merging the particular DR instance 260 with another DR instance 260 based on the change in the service request. That is, two or more "host" PR instances 260 can merge to collectively create a "super" PR instance that contains a superset of functions/services/data of each of the "host" PR instances 260. One or more of the "super" PR instances can be located in the same or different edge clouds, and can collaborate with participating "host" PR instances 260 to collectively provide service.

In some examples, the merge, duplication, split, and merge operations of the DR instances 260 can be further mixed to create feature-rich variations (e.g., a "super" DR instance of a sub-DR instance.)

In an example use case, the physical IMOs can include vehicles, and such vehicle-to-cloud-to-vehicle (V2C2V) communication can be a major use case in automotive edge computing. A local network can mediate the V2V communications by integrating information obtained from neighboring vehicles using digital representations of such vehicles. The consolidated/generated information can be distributed to relevant vehicles and roadside facilitates in the neighboring area. This can require low-latency communications, and improved computing processing to fulfill service timing criteria (e.g., milliseconds or microseconds). The DRs of the vehicles can provide various advanced V2C2V services—a group of DRs can reside in the same edge cloud to perform cooperative network computing for a grouping of connected/autonomous vehicles. Thus, data is exchanged directly between DRs, and process such data using built-in service logic, and returns the processing result to the corresponding vehicle (IMO), enabling quick data acquisition and efficient decision making. This can be implemented in such scenarios as collision avoidance, cruise control for platooning, and signal control to optimize the passing of vehicles from all directions.

Figure 4:
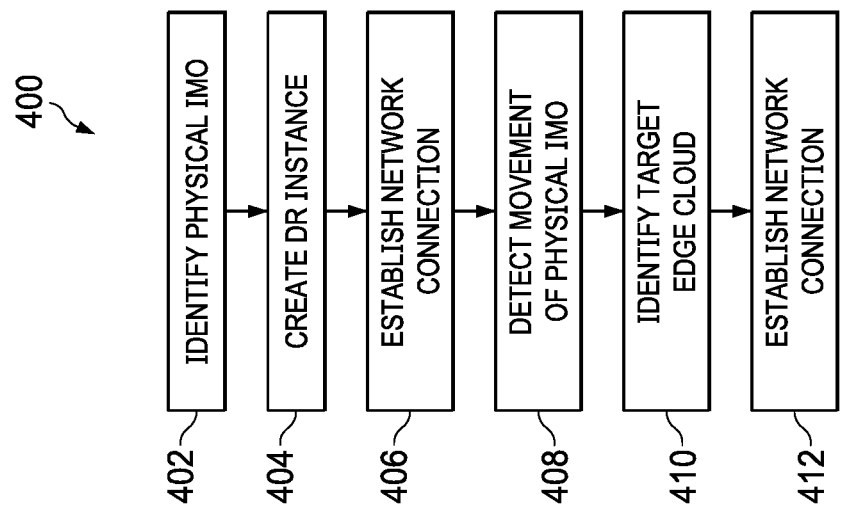
FIG. 4 is a flowchart depicting selected elements of an embodiment of a method for creating and implementing a digital representation of a physical intelligent moving object.

FIG. 4 illustrates a flowchart depicting selected elements of an embodiment of a method 400 for creating and implementing a digital representation of a physical intelligent moving object. The method 400 may be performed by the computing environments 100, 200 described herein with reference to FIGS. 1-3. It is noted that certain operations described in method 400 may be optional or may be rearranged in different embodiments.

A physical IMO 203 is identified (402). In some examples, the physical IMO 203 can be associated with a current location and a service request. The DR arbiter 206, and specifically, the DR dispatcher 222 can create a particular DR instance 260 of a particular physical IMO 203 based on a particular DR template 212 (404). In some examples, the particular DR instance 260 can be created for a particular edge cloud (e.g., edge cloud 202) that is physically closest to the current location of the particular IMO 203. In response to creating the particular DR instance 260 of the particular physical IMO 203, the DR arbiter 206 establishes and maintains a network connection between the particular DR instance 260 and the particular physical IMO 203 (406). The particular DR instance 260 can detect movement of the corresponding particular physical IMO 203 from coverage of the particular edge cloud 202 (408). In response to detecting the movement of the particular physical IMO 203, the particular DR instance 260 identifies a target edge cloud for coverage of the particular physical IMO 203 (410). The particular DR instance 260 further establishes and maintains a network connection between the particular DR instance 260 and the particular physical IMO 203 using the target edge cloud (412).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of communication within a distributed cloud computing environment, the distributed cloud computing environment including a central cloud computing network, a plurality of edge cloud computing networks and a plurality of physical intelligent moving objects (IMOs), the method comprising:

identifying a physical intelligent moving object (IMO), the physical IMO associated with a current location and a service request;

creating, from a digital representation template that is based on the service request, a digital representation instance of the physical IMO in a particular edge cloud of the distributed cloud computing environment that is closest to the current location of the physical IMO, the digital representation instance of the physical IMO includes application program interfaces to communicate with the physical IMO, the central cloud computing network, and a plurality of digital representations associated with the plurality of IMOs;

in response to creating the digital representation instance of the physical IMO, establishing and maintaining a first network connection between the digital representation instance of the physical IMO and the physical IMO using the particular edge cloud, creating at least one duplicate representation instance of the physical IMO and establishing a second network connection between the at least one duplicate representation and the physical IMO, the digital representation instance of the physical IMO and the at least one duplicate representation instance collaborate to collectively provide service to the physical IMO;

detecting a movement of the physical IMO from coverage of the particular edge cloud;

in response to detecting the movement of the physical IMO:

identifying a target edge cloud of the distributed cloud computing environment for coverage of the physical IMO; and establishing and maintaining a third network connection between the digital representation instance of the physical IMO and the physical IMO using the target edge cloud, the third network connection being different from the first network connection and the second network connection.

2. The computer-implemented method according to claim 1, wherein each of the plurality of digital representations is a service-oriented virtual IMO that resides in at least one of the plurality of edge cloud computing networks, and includes state data, service logic for decisions relating to a service provided to the plurality of digital representations, and virtual agility for migration between the plurality of edge cloud computing networks.

3. The computer-implemented method according to claim 1, wherein the plurality of IMOs are self-driving cars and the provided service is associated at least one of braking, steering and acceleration.

\* \* \* \* \*